April 7, 1970 SVEN-ERIK MALMSTROM 3,504,917
SEAL FOR RELATIVELY ROTATABLE PARTS
Original Filed Sept. 8, 1965  3 Sheets-Sheet 1
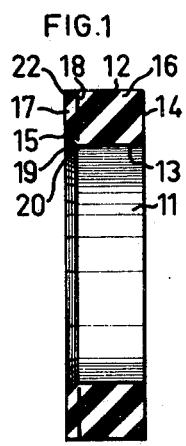
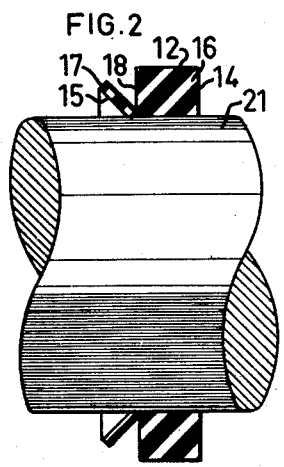
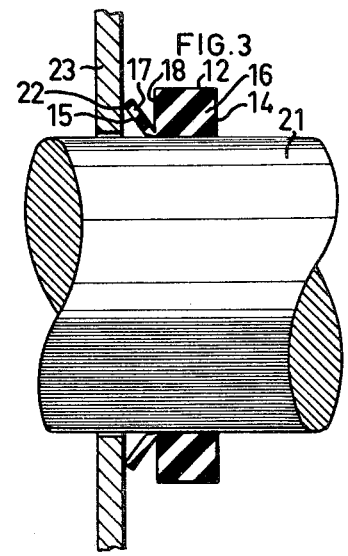
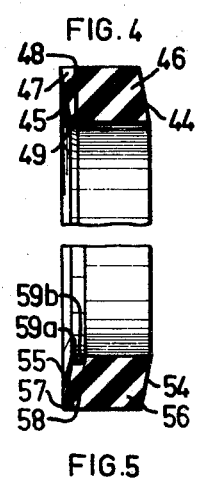
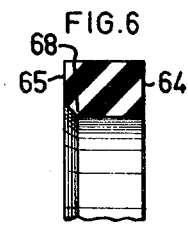
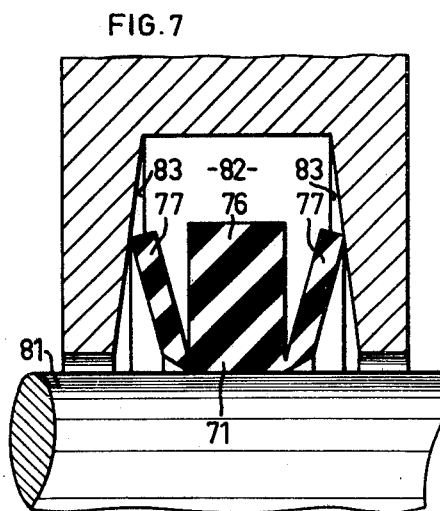

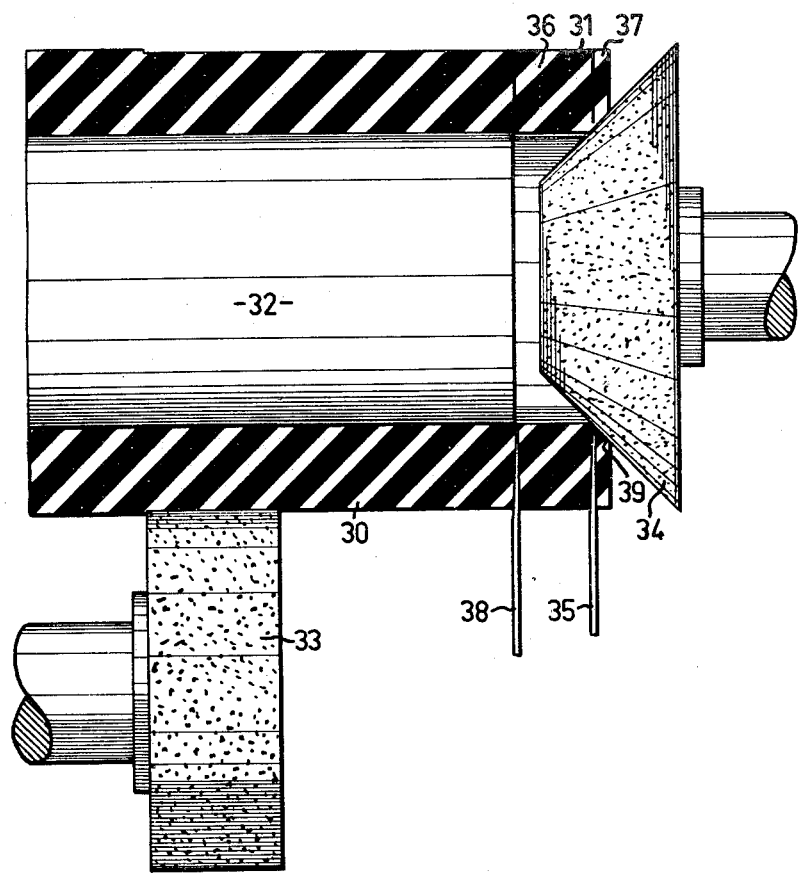

April 7, 1970   SVEN-ERIK MALMSTROM   3,504,917
SEAL FOR RELATIVELY ROTATABLE PARTS
Original Filed Sept. 8, 1965   3 Sheets-Sheet 3

United States Patent Office 3,504,917
Patented Apr. 7, 1970

3,504,917
SEAL FOR RELATIVELY ROTATABLE PARTS
Sven-Erik Malmstrom, Reftele, Sweden, assignor to Forsheda Gummifabrik AB, Forsheda, Sweden, a corporation of Sweden
Continuation of application Ser. No. 485,686, Sept. 8, 1965. This application May 24, 1968, Ser. No. 748,579
Claims priority, application Sweden, Sept. 11, 1964, 10,881/64
Int. Cl. F16j 15/32, 15/54, 15/34
U.S. Cl. 277—25                                    4 Claims

ABSTRACT OF THE DISCLOSURE

A sealing ring of resilient elastomeric material to provide a seal between two relatively rotatable parts of the class wherein a rotary shaft extends through a bearing housing wall disposed transversely of the shaft, comprising an annular body portion having a cylindrical inner circumferential surface and at least one radially extending end surface, and an annular flexible lip portion adjacent said one radial end surface integrally connected with said body portion at and adjacent the inner cylindrical surface thereof, said lip portion having inner and outer radial end faces and in the quiescent state extending substantially perpendicular to the cylindrical inner surface of the body portion confronting and parallel to said one radial end surface of the body portion, the inner circumferential surface of said lip portion being recessed inwardly from the outer end face thereof to a location on the inner circumferential surface of said body portion substantially in radial alignment with said radial end face of the body portion and provide a circumferential hinge of narrow cross section, the inner cylindrical surface of said body portion in the quiescent state thereof having a predetermined diameter less than the diameter of the rotary shaft and operable upon being radially stressed and expanded outwardly when mounted on the rotary shaft adjacent the bearing housing wall to cause said flexible lip portion to be deflected angularly outward into sealing engagement with the wall, said recess affording clearance for the outward deflection of said lip portion and providing a lip supporting surface for engagement with the shaft in the deflected position of said lip portion, to thereby determine the angular position of the lip portion relative to the body portion.

---

This is a continuation of my prior copending application Ser. No. 485,686 filed Sept. 8, 1965 for "Seal for Relatively Rotatable parts and Method for Making the Same," and now abandoned.

This invention relates to a sealing ring of elastomer for providing a seal between two relatively rotatable parts, such as a shaft and a wall through which said shaft extends, the sealing ring comprising on one hand an expansible fastening ring which holds the sealing ring clamped to the shaft in the desired position, and on the other hand at least one annular lip projecting from the inner portion of the fastening ring and in axial sealing engagement with said wall, the sealing ring in the untensioned state thereof being defined by two substantially concentric cylinder surfaces and two concentric end surfaces, one defining the lip and the other the fastening ring. In prior-art sealing devices of a similar type, the lip of the sealing ring is separated from the fastening ring by a V-shaped groove. The sealing ring according to the present invention differs from the prior-art types, substantially by the lip being separated from the fastening ring by an annular cut which extends through the major part of the cross-sectional area of the sealing ring.

The invention is also concerned with a sealing device incorporating the above sealing ring and characterized by the fact that the relation of the diameter of the shaft to the internal diameter of the non-expanded sealing ring is such that before it is engaged with the wall the lip forms a truncated cone with a top angle between 60° and 120°. In a preferred embodiment of invention the inner rim of the end surface defining the lip is connected in the untensioned state to the inner cylinder surface of the ring by means of a substantially conical surface. In a process according to the invention the sealing ring is prepared from a tube of elastomer, said substantially conical surface being produced by a machining tool.

The sealing ring of the present invention has certain advantages over prior sealing rings including the type commonly referred to as the V-ring. In the V-ring, the lip is disposed at an angle relative to the body portion, and the inner wall confronting the shaft is concentric throughout its length.

It has been found that a sealing ring constructed in accordance with the present invention provides effective sealing over a substantial period of use. For example, there are several factors contributing to the aging of rubber materials. These factors include expansion, mass of the rubber and heat. With regard to the expansion factor, it has been observed that the more expanded the rubber, the sooner it will crack, i.e., the greater the rate of aging. When the seal of the present invention is applied to a shaft, the body expands due to the differences in diameter. However, by reason of the construction of the inner wall of the lip, there is relatively little expansion of the lip when it is assembled in place. Accordingly, the lip of the ring of the present invention which is in constant contact with the wall of an assembly to provide a seal, has a greater wear life as compared to the V-ring, wherein the lip is in an expanded state under stress.

Furthermore, the ordinary V-ring has a lip with a little tapered profile and of a smaller cross-section and thus, contact will not be a line contact as is the case with the ring of the present invention. This means the total pressure of the V-ring lip will be considerably greater than was assumed and, thus, the sealing capacity of the ring of the present invention will be better.

A further advantage of the ring of the present invention is that the power losses caused by the ring of the present invention are constant independent of the position relative to the sealing surface. For example, in the V-ring the friction between the lip and the face varies considerably at different axial positions of the V-ring relative to the wall. Thus, the power losses are varied. By contrast with the ring of the present invention the power losses caused by the lip sliding against the sealing surface are almost constant for the reason that as the axial position of the ring changes, the lip tends to assume its original form and is urged away from the sealing surface. The ring of the present invention in an unexpanded position has a very compact form making it easy to handle, pack and to transport.

For further illustration of the invention and the advantages gained thereby, some embodiments will be described in the following, reference being made to the accompanying drawings in which:

FIG. 1 shows a sealing ring in untensioned state;
FIG. 2 shows the sealing ring expanded on a shaft;
FIG. 3 shows the sealing ring in sealing position;
FIGS. 4, 5 and 6 shows sections of three slightly differing embodiments;
FIG. 7 shows a sealing ring having two sealing lips;
FIG. 8 shows a process of making a sealing ring according to FIG. 1;

Figure 9:
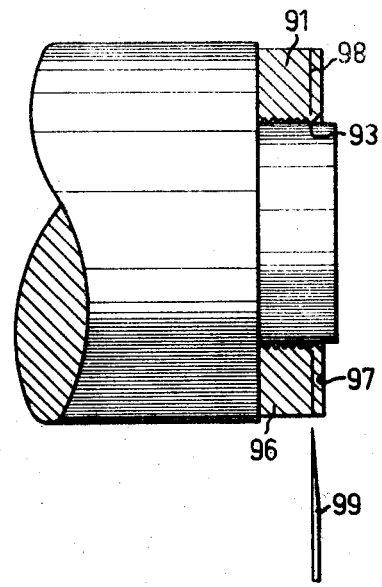
FIG. 9 shows another process of making the sealing ring.

In FIGS. 1, 2 and 3, the numeral 11 designates a sealing ring in accordance with the present invention made of a rubber-elastic material. A suitable material is nitrile and Neoprene rubber having a Shore number of 60°–70° S. The sealing ring comprises an annular body portion having a cylindrical outer circumferential surface 12, a cylindrical inner circumferential surface 13 and radially extending end surfaces 14 and 18. An annular flexible lip portion 17 is disposed adjacent the radial end surface 18 and is integrally connected with the body portion at and adjacent the inner cylindrical surface thereof by a pliant circumferentially extending hinge 20 of lesser thickness than the lip. The lip 17 has an outer radial end face 15 and an inner radial end face. The lip 17, in the quiescent state, extends substantially perpendicular to the cylindrical inner surface 13 of the body portion 16 parallel to the end surface 18 thereof. The inner circumferential wall or surface of the lip 17 is recessed inwardly from the outer end face thereof to a location on the inner circumferential surface of the body portion substantially in radial alignment with the radial end face 18 and the hinge 20. In the present instance the recess defines a frusto-conical inner wall 19 on the lip which serves as a support for the lip 17 when the sealing ring is expanded on a shaft 21 and the lip thereby folds about the hinge 20 and forms a funnel (see FIG. 2) with a top angle which should amount to between 60° and 120°. FIG. 3 shows the sealing ring in mounted position. The lip 17 bears with an acute edge 22 against a wall 23, through which extends the shaft 21 which is rotatable relative to said wall. The lip is pressed slightly rearwardly, for which reason the inherent tension of the lip maintains the edge 22 pressed against the sealing surface 23. In the position the seal occupies in FIG. 3 the shaft may effect a relatively large movement axially. The diametral relation of the shaft 21 to the inner cylinder surface 13 of the non-expanded sealing ring is chosen in such a way that when placing the ring 11 on the shaft 21, the lip 17 forms a truncated cone before it is engaged with the wall 23, said cone having a top angle between 60° and 120°. In practice this implies an expansion of 10 to 20%.

The inner cylindrical surface of the body in the quiescent state is of a predetermined diameter less than the diameter of the shaft 21 whereby when the sealing ring is mounted on the shaft adjacent the bearing housing wall 23 the body portion is radially stressed and expanded outwardly thereby causing the flexible lip 17 to be deflected angularly outward into sealing engagement with the wall. The recess defined by the frusto-conical inner wall 19 of the lip affords clearance for the outward deflection of the lip and provides a lip supporting surface for engagement with the shaft in the deflected position.

In the embodiment shown in FIG. 4 the end surfaces 44 and end face 45 are not entirely plane but slightly conical. The lip 47 and the body portion 46 are separated by a plane cut 48. The slightly conical end face 45 merges into another conical surface 49 with which the lip engages the shaft in sealing position.

The sealing ring shown in FIG. 5 differs from that in FIG. 4 only in that the cut 58 separating the lip 57 from the body portion 56 is parallel to the end face 55 and end surface 54. Moreover, a substantially cylindrical surface 59a and a plane surface 59b are substituted for the conical supporting surface 49 in FIG. 4. In this embodiment the lip edge between the end face 55 and surface 59a engages the shaft.

According to FIG. 6, the end surface 64 and end face 65 are parallel, while the cut 68 is slightly conical.

However, the teachings of the invention are applicable not only to sealing rings having but one lip. Thus, FIG. 7 illustrates a sealing ring 71 having two lips 77 and a fastening ring 76 situated therebetween. The sealing ring is mounted on a shaft 81 and the lips are sealingly applied against two slightly conical walls 83 which define a groove 82 intended to accommodate a conventional felt ring. In the present instance the sealing ring 71 therefore fulfills the function of a felt ring.

The advantages gained over the prior-art types by a sealing ring of the type suggested according to the present invention, primarily reside in that it is extremely simple to manufacture the sealing ring. One way of manufacturing the sealing ring is diagrammatically illustrated in FIG. 8. The starting material for the sealing rings, a rubber tube 30, is advanced stepwise on a mandrel 32 which is rotating according as the tube is ground externally by means of a grinding wheel 33 to provide for a uniform material thickness over the entire cross section. In each step the tube 30 is advanced beyond the mandrel 32 a distance equal to the total width of the sealing ring 31 to be manufactured. A frustoconical grinding wheel 34 bevels the inner edge 39 of the tube to provide the supporting surface by which the lip 37 engages the shaft in the mounted state of the seal. Two knives 38 and 35 are advanced at right angles to the axis of rotation by such a distance that the knife 35 has separated the lip 37 sufficiently from the fastening ring 36. Then the knife 38 fully cuts off the sealing ring proper. The grinding wheel 34 is withdrawn, the cut-off sealing ring 31 falls down and the tube 30 is advanced for a new grinding and cutting operation. A cutting tool may be substituted for the grinding wheel 34.

In the process of manufacture illustrated in FIG. 9 use is made of moulded solid rings 91 of a section substantially agreeing with that of the ring according to FIG. 1. These moulded rings 91 which thus present a conical surface corresponding to the conical surface 19, are rotated by means of a mandrel, a cutting tool 99 making a cut 98 through the major portion of the cross section so that the latter is divided into a fastening ring 96 and a lip 97.

Sealing rings designed in the manner last described are preferably provided with a knurled inner cylinder surface 93. This entails on one hand the advantage that the fastening ring 96 will have a firmer grip about the shaft and on the other hand the advantage that lubricant which at the mounting may have penetrated between the shaft and the fastening ring will be drained away very rapidly between the ridges.

Figure 10:
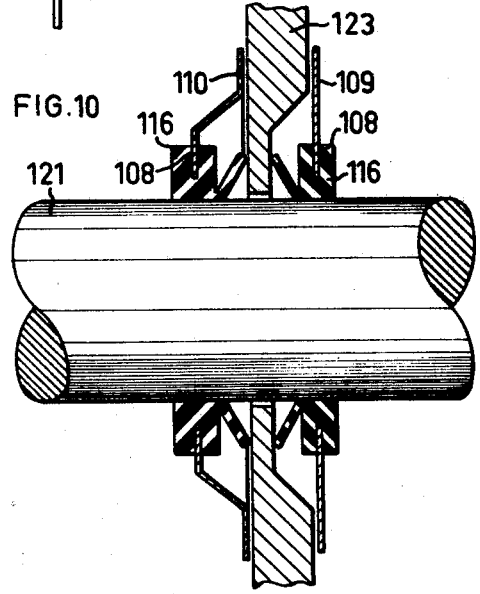
FIG. 10 shows a special embodiment of the sealing ring according to the invention.

In the special embodiment according to FIG. 10, a further cut 108 is made in the sealing ring. An annular disk 109, 110, preferably of metal and having such an internal diameter that it will clamp the fastening ring 116 slightly against the shaft 121, is fixed in the resulting notch. The disk will thereby prevent the fastening ring 116 from losing its grip about the shaft 121 at high speeds thereof.

The appearance and external diameter of the disk 109, 110, may be selected according to the task the disk has to serve. In case a favourable throw-off is desired, the external diameter of the disk is made much larger than the fastening ring 116. FIG. 10 illustrates two ways of arranging sealing devices in which the disk 109, 110 together with the sealing wall 103 constitutes a gland or labyrinth packing. The disk also provides an efficient mechanical protection for the sensitive lip.

I claim:

1. A sealing ring of resilient elastomeric material to provide a seal between two relatively rotatable parts of the class wherein a rotary shaft extends through a bearing housing wall disposed transversely of the shaft, comprising an annular body portion having a cylindrical inner circumferential surface and at least one radially extending end surface, and an annular flexible lip portion adjacent said one radial end surface integrally connested with said body portion at and adjacent the inner cylindrical surface thereof, said lip portion having inner and outer radial end faces and in the quiescent state extending substantially perpendicular to the cylindrical inner surface of the body portion confronting and parallel to said one radial end surface of the body portion, the inner circumferential surface of said lip portion having a diameter greater than the diameter of the inner circumferential surface of said body portion in the quiescent state thereof extending inwardly from the outer end face of said lip portion to a location substantially in radial alignment with the adjacent radial end face of the body portion, and providing a circumferentially extending pliant hinge connection between said lip and body portion adjacent one end of the cylindrical inner surface of said body portion and the inner circumferential surface of said lip portion, the inner cylindrical surface of said body portion in the said quiescent state thereof having a predetermined diameter less than the diameter of the rotary shaft and operable upon being radially stressed and expanded outwardly when mounted on the rotary shaft adjacent the bearing housing wall to cause said flexible lip portion to be deflected angularly outward into sealing engagement with the wall, the said greater diameter of the inner circumferential surface of the lip portion providing clearance affording outward deflection of said lip portion substantially free of stresses caused by radial stressing and expansion of said body portion when mounted on the rotary shaft and also providing support means limiting angular deflection of the lip portion relative to the body portion.

2. A sealing ring as claimed in claim 1 wherein said inner surface of said lip portion is frustoconical.

3. A seal as claimed in claim 1 wherein the inner peripheral surface of said body is knurled.

4. A seal as claimed in claim 1 including a lip at opposite axial ends of said body.

References Cited

UNITED STATES PATENTS

| 2,561,694 | 7/1951 | Gilbert | 277—25 |
| 3,016,251 | 1/1962 | Gilbert | 277—25 |

FOREIGN PATENTS

| 249,981 | 5/1963 | Australia. |
| 593,271 | 10/1947 | Great Britain. |

SAMUEL ROTHBERG, Primary Examiner

U.S. Cl. X.R.

277—95, 63